(12) United States Patent
Gardner et al.

(10) Patent No.: US 12,727,591 B2
(45) Date of Patent: Sep. 8, 2026

(54) LARGE FLY BAIT MULTI-STATION TOOL

(71) Applicant: ECOLAB USA INC., Saint Paul, MN (US)

(72) Inventors: Douglas B. Gardner, Saint Paul, MN (US); Carlos Pando, Saint Paul, MN (US); Larry Lake, Saint Paul, MN (US); Bennett Jordan, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/333,224

(22) Filed: Jun. 12, 2023

(65) Prior Publication Data

US 2023/0397593 A1 Dec. 14, 2023

Related U.S. Application Data

(60) Provisional application No. 63/366,298, filed on Jun. 13, 2022.

(51) Int. Cl.
*A01M 1/20* (2006.01)
*A01M 1/04* (2006.01)

(52) U.S. Cl.
CPC ............ *A01M 1/2016* (2013.01); *A01M 1/04* (2013.01)

(58) Field of Classification Search
CPC .......... A01M 1/14; A01M 1/145; A01M 1/00; A01M 1/02; A01M 1/023; A01M 1/10; A01M 1/106; A01M 1/20; A01M 1/2005; A01M 1/2016; A01M 1/04
USPC ........................... 43/131, 114, 107, 124, 113
See application file for complete search history.

(56) References Cited

U.S. PATENT DOCUMENTS 4,894,947 A * 1/1990 Brandli ............... A01M 1/2016 43/131
4,959,923 A 10/1990 Aiello et al.
5,365,690 A * 11/1994 Nelson .................. A01M 1/145 43/113
5,722,199 A * 3/1998 Demarest ............. A01M 1/145 43/113
5,771,628 A 6/1998 Nobbs
(Continued)

FOREIGN PATENT DOCUMENTS

WO 2004054358 A2 7/2004

OTHER PUBLICATIONS

International Search Report and Written Opinion in PCT/US2023/068272, mailed Oct. 10, 2023, 12 pages.

*Primary Examiner* — William L Gmoser
(74) *Attorney, Agent, or Firm* — McKee, Voorhees & Sease, PLC

(57) ABSTRACT

A flying insect station includes a surface that is treated with a bait product, such as a pesticide. The surface of the station is an attractant to flying insects, such as large flies, due to contrasting colors and/or a pattern surface, which increases interaction by flies with the surface and also aids in the retention of the pesticide at the surface. The patterns can take many forms. In addition, the surface can include portions that are smooth at the molecular level and other portions that are textured in order to better hold and retain the pesticide. The station, in conjunction with the pesticide, allows a service specialist to use the product on a placement surface in more places indoors than they could by spraying during non-operational hours.

20 Claims, 11 Drawing Sheets

(56) References Cited

U.S. PATENT DOCUMENTS 9,737,065 B1 * 8/2017 Hottel .................. A01M 1/103
11,751,555 B1 * 9/2023 Koehler ................ A01M 1/106
43/113
2002/0078620 A1 * 6/2002 Nelson .................... A01M 1/04
43/113
2003/0079398 A1 * 5/2003 Holmes ................ A01M 1/145
43/113
2006/0086039 A1 4/2006 Israely et al.
2010/0024278 A1 * 2/2010 Simchoni-Barak ... A01M 1/145
43/107
2010/0158965 A1 * 6/2010 Beitzel .................. A01N 25/34
43/132.1
2012/0151821 A1 * 6/2012 Kovacs ................ A01M 1/106
43/107
2015/0060565 A1 * 3/2015 Furner .................... A01M 1/02
239/34
2016/0242402 A1 8/2016 Johnston et al.
2019/0261616 A1 * 8/2019 Studer .................. A01M 1/106

* cited by examiner 12
15
16
24
14
19
17
18
20
26

30
31
34
32
36

LARGE FLY BAIT MULTI-STATION TOOL

CROSS REFERENCE TO RELATED APPLICATIONS

This application claims priority under 35 U.S.C. § 119 to provisional patent application U.S. Ser. No. 63/366,298, filed Jun. 13, 2022. The provisional patent application is herein incorporated by reference in its entirety, including without limitation, the specification, claims, and abstract, as well as any figures, tables, appendices, or drawings thereof.

TECHNICAL FIELD

Aspects and/or embodiments of the present disclosure relate generally to pest elimination. More particularly, but not exclusively, the disclosure includes aspects and/or embodiments related towards tools, apparatus, system, and/or methods for the application of fly traps and/or pesticides for use inside of buildings.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Numerous designs of fly traps are commercially available, some use light in the form of color to attract flying insects such as flies, or the like, onto a structure or into an enclosure where they are entrapped and/or killed by a pesticide in solid or gas form. Still, these designs have proven to be only marginally effective at attracting and killing flies within a short window of time. The window of time being measured generally from the moment the fly enters an area, such as the interior or exterior area of a structure, until the fly is attracted to and killed by the suppression means.

Pesticides have been known to be effective for the control and elimination of flying insects, such as flies and the like. Pesticides, while effective, are largely regulated. For example, pesticides used in areas such as commercial restaurants, such as in the kitchen and/or dining area, may only be used on certain surfaces when people are not in the area. This limits the use of pesticides to times when the restaurant is closed or otherwise shut down. This is also true for additional locations, which may include hotels, stores, hospitals, manufacturing facilities, and the like. The use of pesticides in any of these commercial settings can be limited, such as via regulations, as a protection to the patrons of the locations.

In addition, while the pesticides are helpful in the elimination of flying insects, the insects will still need to be exposed to the pesticide, such as via direct contact with the pesticide. Even when the pesticide is applied in a place under the regulations, it is still dependent on flies and other flying insects to contact the same. Otherwise, the application, including potential shutdown of the location, may have been an exercise in futility.

Thus, there exists a need in the art for an apparatus that provides an effective solution for the elimination of flying insects in operational areas of commercial business, such as in the kitchens of the same. There also exists a need for the improvement of the attractiveness and usefulness for a tool in getting flying insects to interact with a surface comprising a pesticide in order to eliminate unwanted pests more efficiently.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to provide an improved flying insect elimination device to be used in a greater number of areas. For example, the device can be used with a pesticide in places, such as kitchens, where the pesticide cannot be directly applied.

It is still yet a further object, feature, and/or advantage to provide a flying insect station that includes surface patterns in the form on non-planar portions to attract flying insects.

It is still another object, feature, and/or advantage to provide a surface that includes at least a raised portion in the form of a pattern and a substantially smooth surface.

It is yet another object, feature, and/or advantage to provide a flying insect attraction station that includes contrast colors and a pattern surface, as well as a smooth surface and a surfaced texted to maximize hold and retention of aerosolized pesticides applied to the surface of the station.

Any of the patterns can include, but are not limited to, dimples (in and out), framing (outward and inward), and/or curved, swirl tracks. The use of the contrast colors and a surface texture to improve pesticide retention, reduce drippage, improve distribution of product through wetting of product, and increase fly interaction with the station.

The device/station disclosed herein can be used in a wide variety of applications. For example, the use of the insect station device with the pesticide allows for the use of the pesticide in any number of operational areas, such as kitchens and the like.

The insect station can be used with a mounting or docking station that can be positioned on any number of surfaces, and the insect station can be releasably connected to the docking station to provide a removable insect station for use at the surface.

It is preferred the apparatus be safe, cost effective, and durable. For example, this tool, in conjunction with the pesticide, allows the service specialist to use the product (on the placement) in more places inside than they could by being limited to only spraying during non-operational hours.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of a flying insect station which accomplish some or all of the previously stated objectives.

The insect station can be incorporated into systems or kits that accomplish some or all of the previously stated objectives.

According to some aspects, a flying insect system comprises a station body having a fly attractant surface, said fly attractant surface comprising one or more surface patterns comprising one or more non-planar portions, a textured surface portion, and a substantially smooth portion, a surface mount connected to the station body and configured to mount the station body at a surface, and a pesticide associated with the fly attractant surface.

According to at least some aspects and/or embodiments of the present disclosure, wherein the fly attractant surface further comprising contrasting colors.

According to at least some aspects and/or embodiments of the present disclosure, the one or more surface patterns comprise dimples; framing; curved swirl tracks; or a combination thereof.

According to at least some aspects and/or embodiments of the present disclosure, the substantially smooth portion is smooth to the molecular level.

According to at least some aspects and/or embodiments of the present disclosure, the textured surface portion comprises a glossy or matte texture.

According to at least some aspects and/or embodiments of the present disclosure, the pesticide comprises an aerosolized product and the textured surface portion aids in holding and retaining said aerosolized product.

According to at least some aspects and/or embodiments of the present disclosure, the surface mount comprises one or more slots.

According to at least some aspects and/or embodiments of the present disclosure, the station body comprises one or more tabs for releasably connecting with the one or more slots of the surface mount.

According to at least some aspects and/or embodiments of the present disclosure, the one or more tabs are snap fit into the one or more slots to provide the releasable connection between the station body and the surface mount.

According to addition aspects a combination, including a flying insect station and mount, comprises a flying insect station comprising a station body having a fly attractant surface, said fly attractant surface comprising one or more surface patterns comprising one or more non-planar portions and a pesticide associated with the surface; and a mount for positioning the flying insect station at a surface, said mount releasably connectable to the flying insect station.

According to at least some aspects and/or embodiments of the present disclosure, the fly attractant surface further comprises a textured surface portion and a substantially smooth portion.

According to at least some aspects and/or embodiments of the present disclosure, the substantially smooth portion is smooth to the molecular level.

According to at least some aspects and/or embodiments of the present disclosure, the textured surface portion comprises a glossy or matte texture.

According to at least some aspects and/or embodiments of the present disclosure, the one or more surface patterns comprise dimples; framing; curved swirl tracks; or a combination thereof.

According to at least some aspects and/or embodiments of the present disclosure, the dimples comprise a plurality of alternating in and out surfaces.

According to at least some aspects and/or embodiments of the present disclosure, the surface mount comprises one or more slots, and the station body comprises one or more tabs for releasably connecting with the one or more slots of the surface mount.

According to at least some aspects and/or embodiments of the present disclosure, the one or more tabs are snap fit into the one or more slots to provide the releasable connection between the station body and the surface mount.

According to yet additional aspects, a flying insect system comprises a station body having a fly attractant surface, said fly attractant surface comprising one or more surface patterns comprising one or more non-planar portions, a textured surface portion, and a substantially smooth portion; a surface mount connected to the station body and configured to mount the station body at a surface; wherein the surface mount comprises one or more slots, and the station body comprises one or more tabs for releasably connecting with the one or more slots of the surface mount; and a pesticide associated with the fly attractant surface.

According to at least some aspects and/or embodiments of the present disclosure, the fly attractant surface further comprises contrasting colors.

According to at least some aspects and/or embodiments of the present disclosure, the mount includes a mount surface comprising an adhesive for mounting the mount to the surface.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
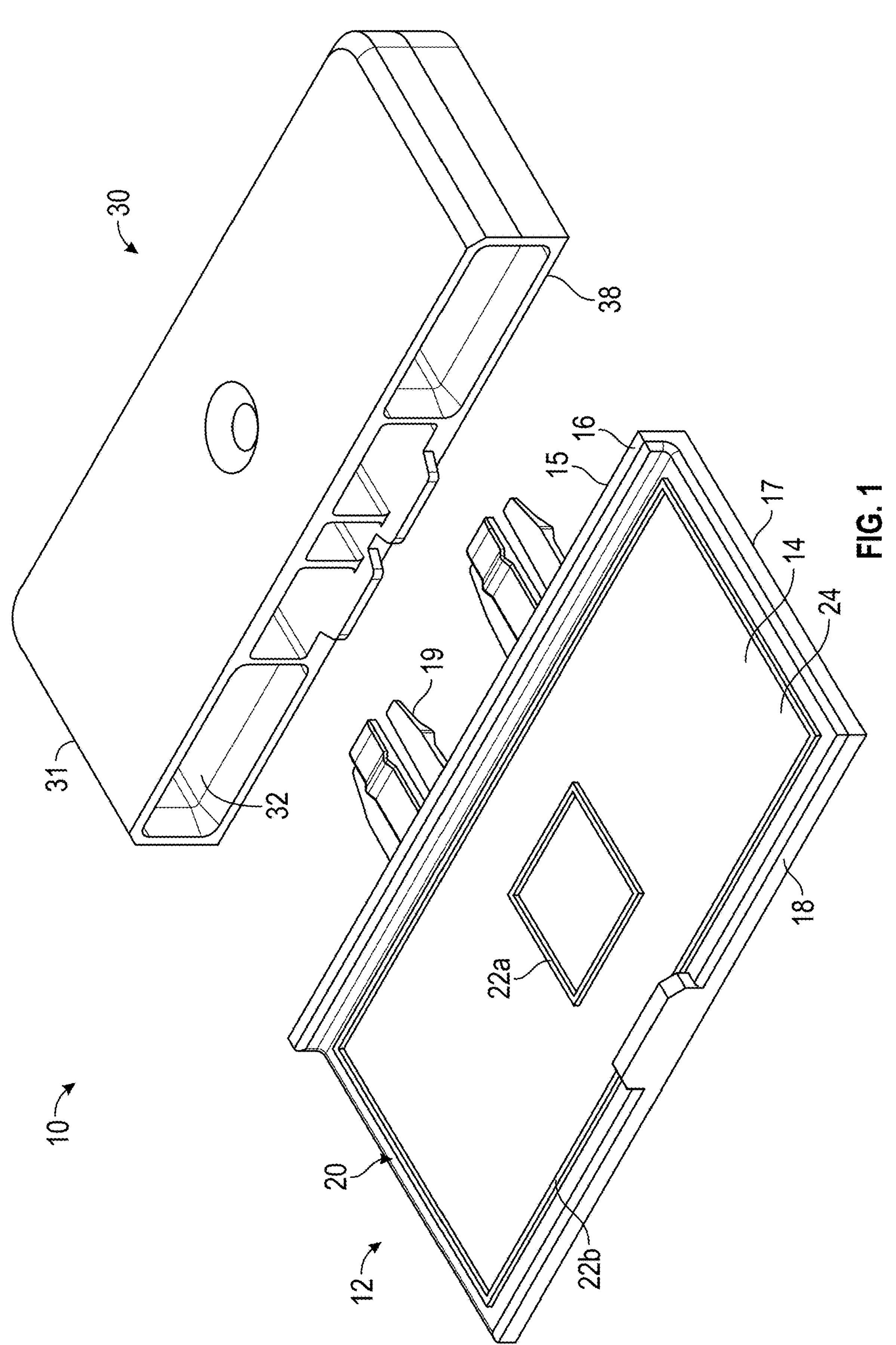
FIG. 1 is a perspective view of a flying insect system including a flying insect station and a mount according to aspects and/or embodiments of the disclosure.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The terms "station" and "tool" are generally meant to be similar and cover the same or similar aspects and/or embodiments. The terms are to be considered interchangeable.

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Flying insects, such as small flies, large flies, and the like, pose a nuisance and health threat to industries, such as hospitality industries. There is a need to reduce the number of flying insects, or even to eliminate the flying insects altogether, in such places as kitchens, dining areas, lounges, operational areas, and any other room or location. While the use of pesticides can aid in the reduction and/or elimination of flying insects, these are largely regulated and can be limited as to time and exposure for use. For example, one type of pesticide is the EPA registered pesticide called PT Alpine Pressurized Fly Bait (EPA Reg. No. 499-568). According to the regulations, this pesticide cannot be applied, inter alia, directly on food preparation surfaces or dining surfaces where foods for consumption may come in contact. This can be challenging for food preparation/operational areas, such as kitchens. In addition, it is known that flying insects tend to congregate around areas including, but not limited to, garbage containers, behind vending machines, under bars, and the like.

Therefore, in order to utilize the pesticide in such areas, along with other areas where the direct application of a pesticide is unwanted or otherwise not allowed, aspects and/or embodiments of the present disclosure include a flying insect system 10, such as that shown in FIG. 1. As shown in the figure, the flying insect system 10 includes a fly station or tool 12 and a mount 30. As will be understood, the mount 30 is used to position the station 12 in place at a surface for use. The mount 30 can include an adhesive (e.g., glue, tape, or the like) or a mechanical fastener (e.g., screws, bolts, or the like), or could even be connected to a hook or other appendage to position the system 10 at a surface or location. For example, an adhesive such as tape or glue could be positioned at a bottom 38 of the mount and the mount 30 held in place thereby.

In addition, it is noted that the station 12 includes tabs 19 extending therefrom. The tabs 19 may be snaps or friction fit members that align with and are positioned within slots 32 of the mount body 31. The tabs 19 and slots 32 can be configured to provide a releasable connection between the station 12 and the mount 30. Thus, the mount can be more permanently affixed at a location, and the station 12 swapped out between uses, such as to replace, clean, or otherwise remove the connection between the components. As shown in the figures, the tabs 19 can include a raised portion that will hold the tabs 19 in the slots, but actuation of the tabs 19 will loosed or disconnect the tabs such that they can be removed from the slots 32.

Referring to the station 12 as shown in FIG. 1, a body is provided. The body of the station 12 includes an attractant surface 14, which is the surface configured to lure and entice flying insects. As will be understood, the surface 14 can be covered, fully or partially, with a pesticide, such as PT Alpine Pressurized Fly Bait or other registered pesticides. The attractiveness of the surface 14 will lure the flying insects to the surface, where the flying insects will interact with the pesticide, which will end up killing the flying insect. The pesticide may stick with the flying insect to be taken back to a location with other flying insects, wherein multiple insects will be effectively eliminated by the interaction with the surface 14.

Additional aspects of the station 12 include a mount side 15. The tabs 19 extend away from the surface 14 at the mount side 15 to mount the station 12 to the mount 30. A raised wall 16 is positioned along the mount side 15, which provides greater surface area to contact the mount 30, which will provide structural support for the system 10.

A rear side 17 refers to the surface or side of the station 12 opposite the attractant surface 14. This rear side 17 may be facing, adjacent, and/or in contact with the surface of the location of use of the station 12. Edges 18 are the sidewalls surrounding the attractant surface 14 on the three sides not including the mount side 15.

The station 12 comprises plastic, such as high density polyethylene (HDPE). However, it should be appreciated that other types of materials comprise the station, including other plastics, metals, glasses, or the like, which may also be selected based upon the attractiveness or attractive features of the materials.

As noted, the attractant surface 14 is configured to attract flying insects. This is done mainly by the design of the attractant surface 14, which can comprise the use of contrast colors and a pattern surface to improve pesticide retention and increase fly interaction with the tool. As is known, such as is included in U.S. Ser. No. 17/247,135, which is hereby incorporated by reference, contrasting colors provides an attraction mechanism for flying insects. Visual stimulus is one of the most important determinants in fly behavior, so the tool can include contrasts in colors (blue base and black pattern vs. black base and black pattern). The project also focuses on what pattern texture would imitate 'cracks and crevices' the best to maximize fly interaction with the tool, as well as utilizing a matte or gloss surface finish. Therefore, the station/tool as shown and described herein provides an additional feature, which is a physical pattern on the surface 14 to further attract and keep insects at the surface to allow the pesticide to effectively eliminate the insects.

For example, the tool 12 shown in FIG. 1 includes a physical pattern 20. The pattern of the figure includes raised ridges 22*a* and 22*b* that are raised relative to a substantially planar portion 24 of the surface. The raised ridges 22*a* and 22*b* are in the form of a frame pattern in FIG. 1, wherein the inner ridge 22*a* is a square shape that is inset from the outer ridge 22*b*. It is noted that the outer ridge 22*b* is generally a rectangular shape. However it should be appreciated that either of the ridges 22*a* or 22*b* may be in other geometrical or non-geometrical shapes. It has been found that the framed pattern of the ridges does provide advantages for the attraction of the insects.

In other areas of the tool 10, such as at the substantially planar portion 24 of the surface 14, a substantially smooth surface to the molecular level is provided for flying insect interaction. In addition, a surfaced texture (e.g., glossy, matte, etc.) can also be provided at portions of the substantially planar portion 24 to maximize hold and retention of aerosolized products sprayed onto the surface 14 through factors such as surface tension.

Still further, as noted, the surface 14 can include contrasting colors for any portions of the surface so as to provide greater attraction in addition to the physical pattern. The tool 12 and the mount 30 will allow the surface 14 of the tool 12 to be sprayed or otherwise applied with an EPA registered pesticide and used in areas where the pesticide is not to be directly applied, such as a surface of a kitchen. Thus, the tool 12, in conjunction with the pesticide, allows a service specialist to use the pesticide (on the placement of the tool) in more places inside than they could by spraying during non-operational hours.

Figure 2:
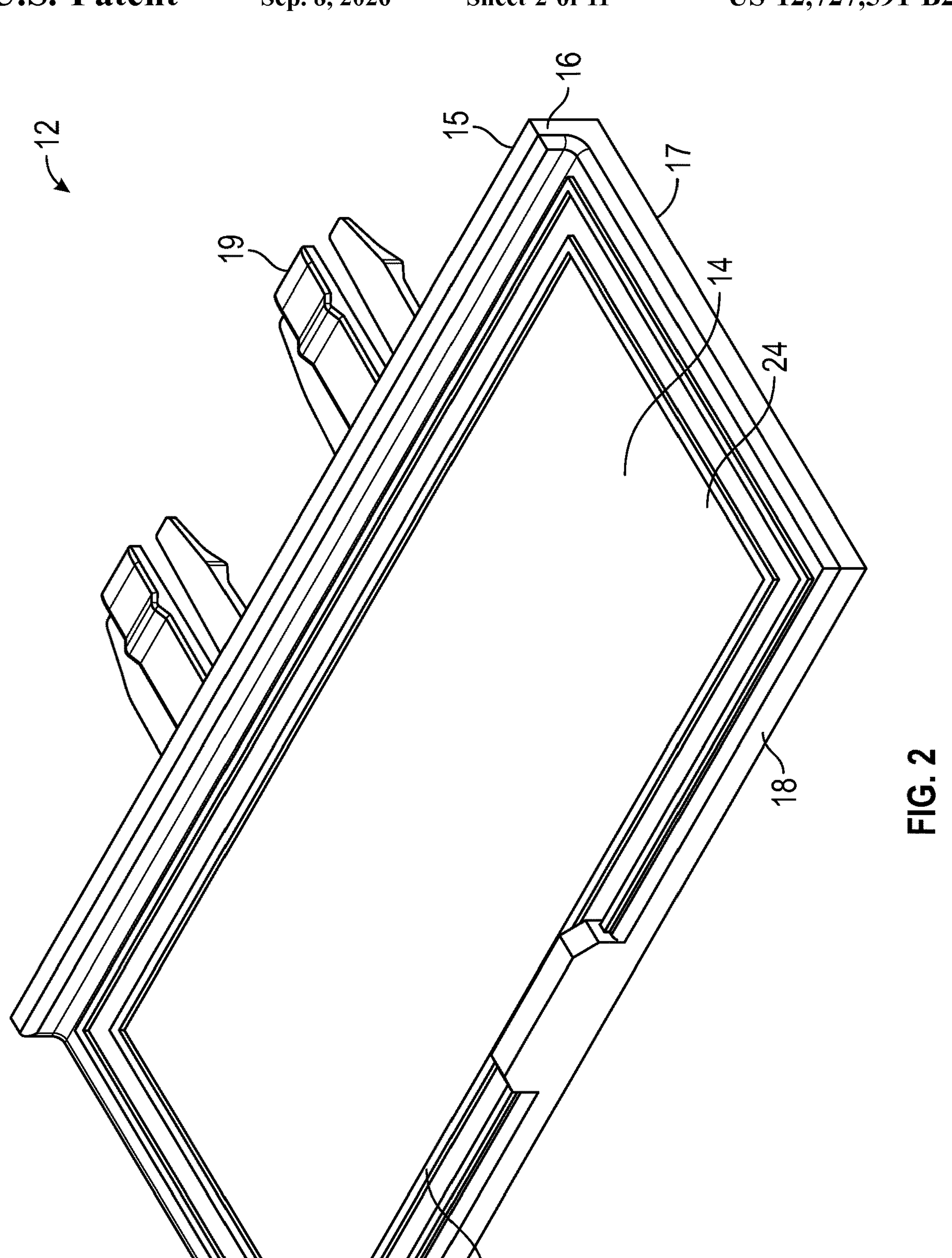
FIG. 2 is another perspective view of a flying insect station with a framed pattern according to aspects and/or embodiments of the disclosure.

FIG. 2 is another depiction of a tool 12 for use in a flying insect system 10. The tool 12 of FIG. 2 also includes the attractant surface 14, which can include contrasting colors and/or a physical pattern 20. The tool 12 also includes the mounting side 15 with tabs 19 extending therefrom for releasably mounting to a mount 30 (not shown). The raised wall 16 is also shown. Still further, an underside surface 17 opposite the attractant surface 14 is provided, along with the edges 18.

The physical pattern 20 of FIG. 20 is another version of a framing pattern and includes an inner ridge 22*a* and an outer ridge 22*b*. The ridges 22*a*, 22*b* are shown to be concentric/coaxial rectangles, with the ridges 22*a*, 22*b* generally adjacent one another in closer proximity than the ridges of FIG. 1. Again, the ridges could take generally any shape and be substantially concentric to be considered a framing pattern, such as that shown in FIG. 2.

It should also be noted that the planar portions 24 of the surface 14 of the tool 12 of FIG. 2 can also include the substantially smooth surface to the molecular level, as well as the surfaced texture (e.g., glossy, matte, etc.) that can also be provided at portions of the substantially planar portion 24 to maximize hold and retention of aerosolized products sprayed onto the surface 14 through factors such as surface tension.

Figure 3:
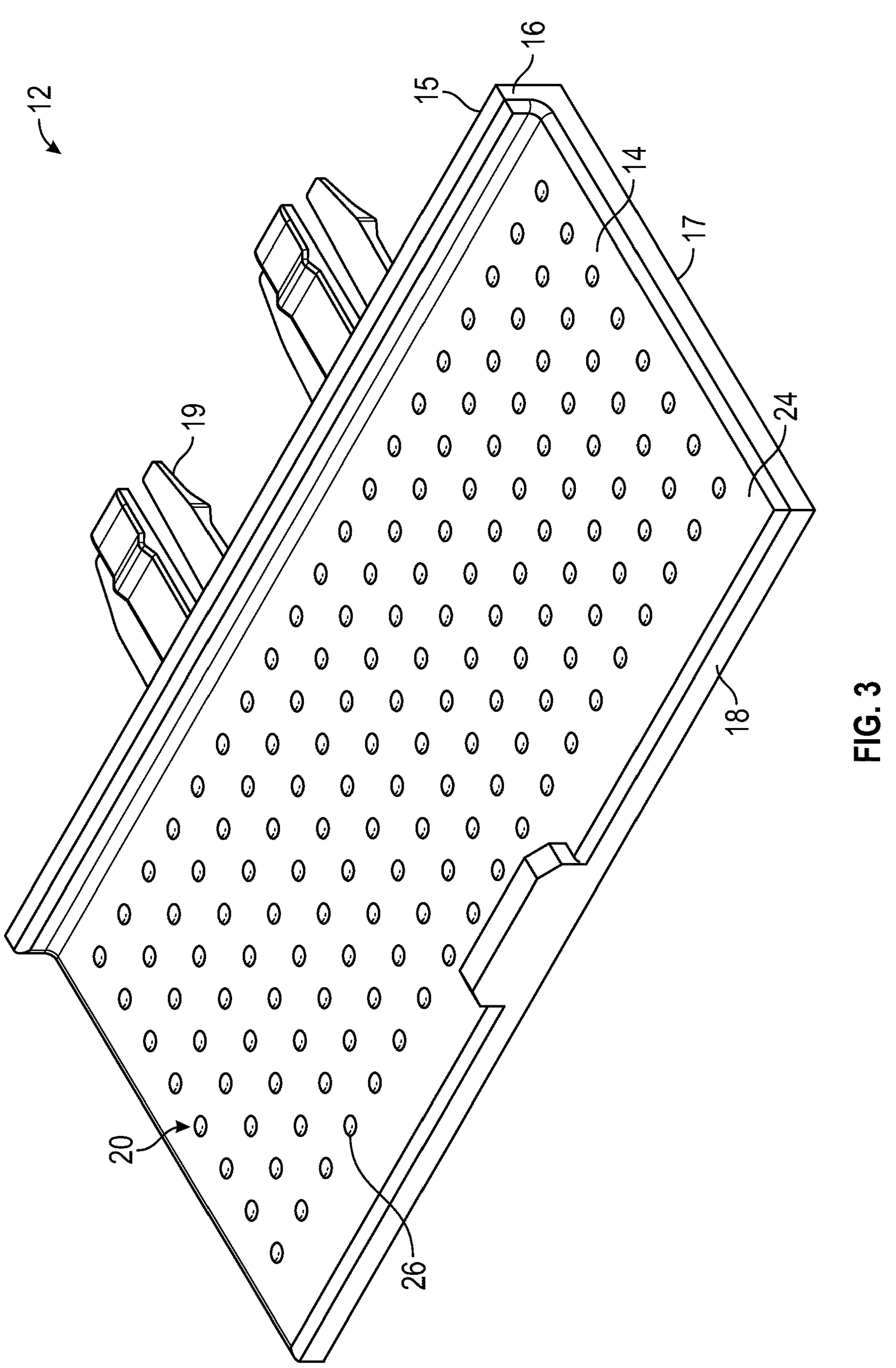
FIG. 3 is another perspective view of a flying insect station with an inward, dimpled pattern according to aspects and/or embodiments of the disclosure.

FIG. 3 is yet another depiction of a tool 12 for use in a flying insect system 10. The tool 12 of FIG. 3 also includes the attractant surface 14, which can include contrasting colors and/or a physical pattern 20. The tool 12 also includes the mounting side 15 with tabs 19 extending therefrom for releasably mounting to a mount 30 (not shown). The raised wall 16 is also shown. Still further, an underside surface 17 opposite the attractant surface 14 is provided, along with the edges 18.

The physical pattern 20 of FIG. 3 is in the form of a plurality of dimples 26. The dimples 26 in FIG. 3 comprise bowl-shaped portions that extend inwardly of the surface 14 and towards the opposite surface 17. Thus, the physical pattern 20 of the inward dimples 26 appears to be a plurality of little bowls into the surface 14 and separated by substantially planar portions 24 of the surface. Thus, the dimples 26 of FIG. 3 are generally concave relative to the surface 14. The planar portions 24 of the surface 14 of the tool 12 of FIG. 3 between the dimples 26 can also include the substantially smooth surface to the molecular level, as well as the surfaced texture (e.g., glossy, matte, etc.) that can also be provided at portions of the substantially planar portion 24 to maximize hold and retention of aerosolized products sprayed onto the surface 14 through factors such as surface tension.

The inward dimples 26 of FIG. 3 provide a physical pattern that is attractive to the flying insects. The insects will be lured to the surface 14, where the pesticide will be transferred to the insects, which will eliminate the same.

Figure 4:
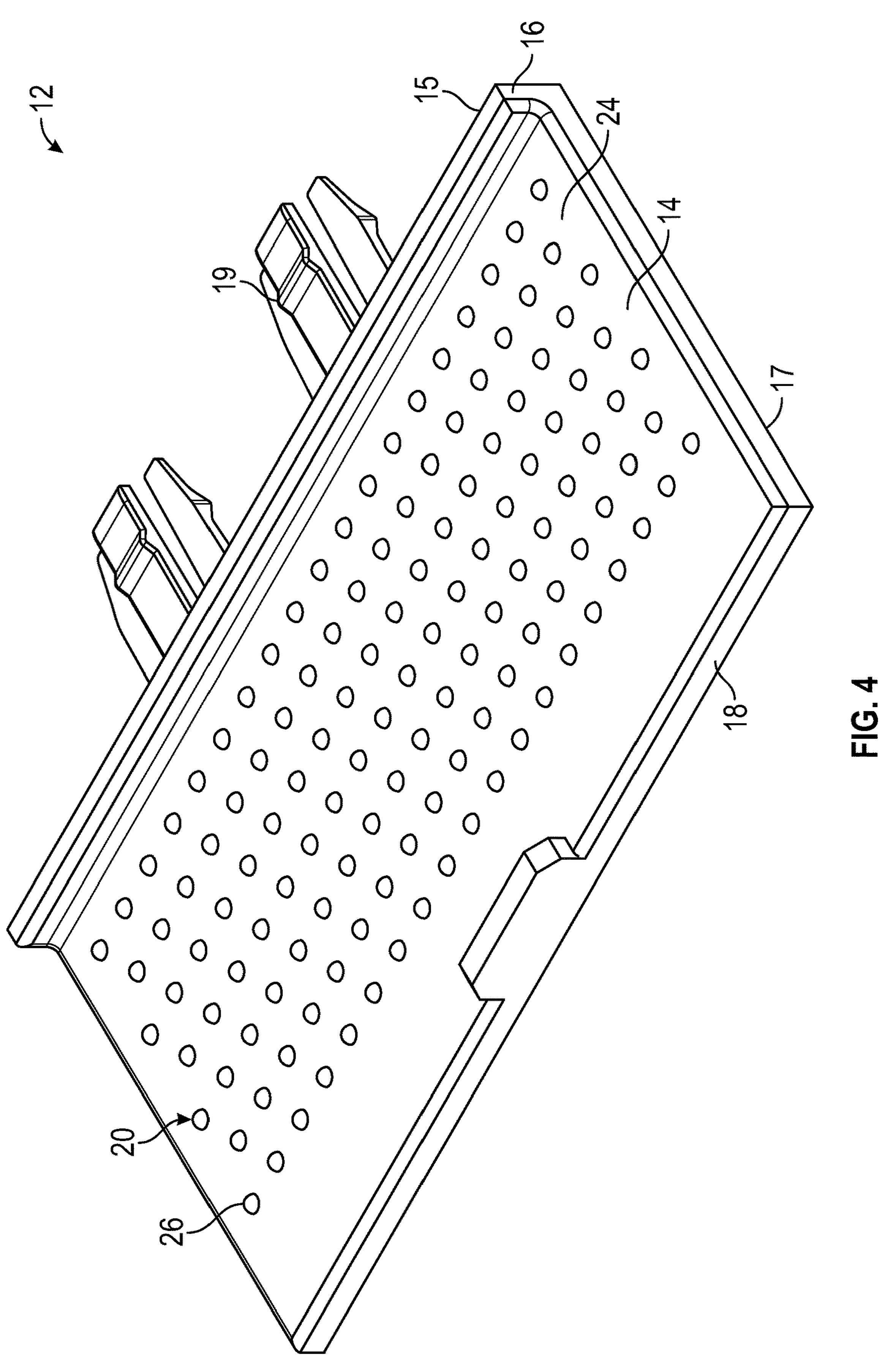
FIG. 4 is another perspective view of a flying insect station with an outward, dimpled pattern according to aspects and/or embodiments of the disclosure.

FIG. 4 is a depiction of a tool 12 similar to that of FIG. 3, but with a physical pattern 20 in the form of outward protruding dimples 26. In FIG. 4, the dimples 26 comprise bowl-shaped protrusions that are convex to the surface 14 and extend away from said surface 14. It should also be appreciated that the tool 12 include a combination of convex and concave dimples used together on a surface, which will provide another physical surface pattern.

Figure 5:
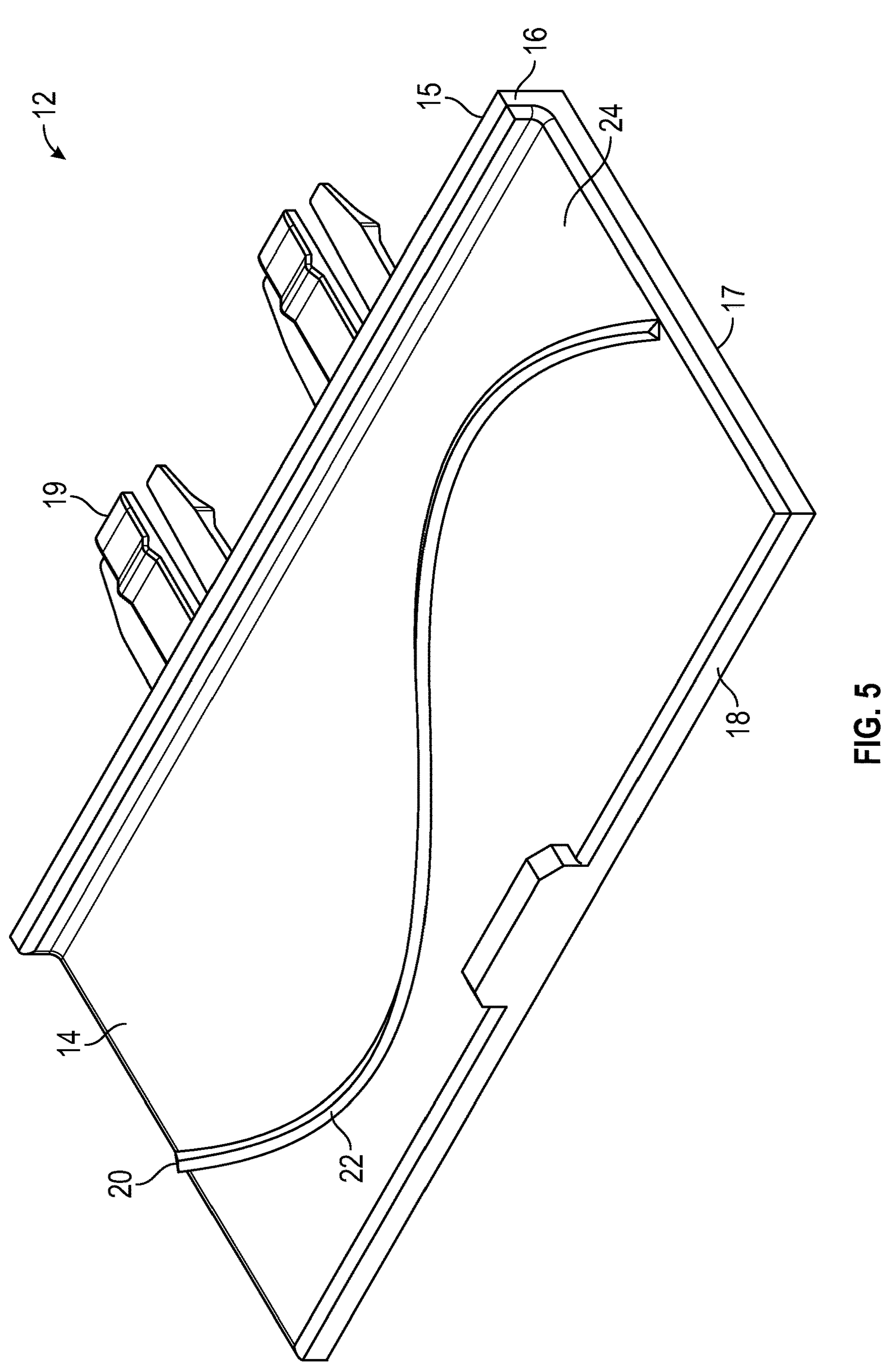
FIG. 5 is another perspective view of a flying insect station with a curved swirl pattern according to aspects and/or embodiments of the disclosure.

FIG. 5 is yet another depiction of a tool 12 for flying insects, including many of the same features as the previously described tools. This includes the attractant surface 14. However, the tool 12 shown in FIG. 5 shows a difference physical surface pattern 20. The pattern 20 shown in FIG. 5 is a curved, swirl ridge 22, that is a raised portion relative to the attractant surface 14. A single, raised ridge 22 is shown at the surface 14 and is curved and/or swirled as it transverses the surface area of the attractant surface 14. This provides a different pattern to attract flying insects. Variations of the swirled ridge can include changing the length of the ridge to be less than the width of the surface, as well as provide more or fewer curve or even changing the curvature of the ridge. Thus, it should be appreciated that the variations are near-limitless to provide additional physical surface patterns for attracting flying insects and also retaining the pesticide to aid in the elimination of the insects at the locations of use, such as in interiors where the pesticide cannot be directly applied.

Figure 6:
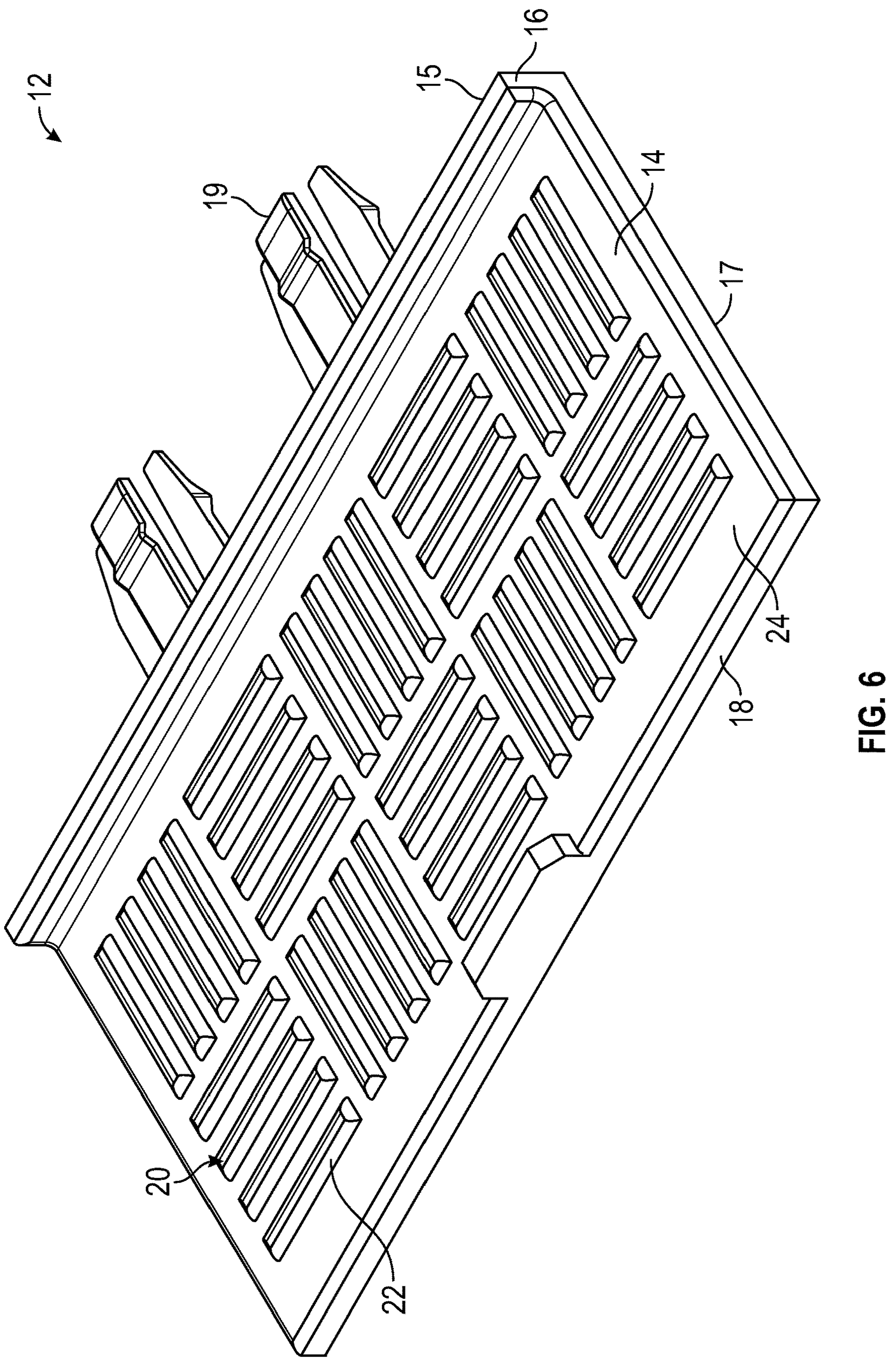
FIG. 6 is another perspective view of a flying insect station with a tracked pattern according to aspects and/or embodiments of the disclosure.

FIG. 6 provides another version of the physical pattern 20 for a tool 12, such as any of the tools provided. In FIG. 6, the pattern 20 comprises a plurality of raised ridges 22 that are positioned in cross-hatched or alternating orientation to an adjacent grouping of ridges. For example, four ridges of length less than the length or width of the surface 14 are provided with matching orientation adjacent another grouping of four ridges that are oriented approximately 90-degrees to the first grouping. The substantially planar surface 24 is located between the ridges and groups of ridges. Such a pattern 20 provides yet another physical surface that is attractive to flying insects and also aids in retaining a pesticide.

Therefore, it should be appreciated that the physical patterns 20 can take any number of forms and/or configurations. This includes the pattern being raised from the attractant surface 14 or being set into said surface. The pattern 20 will generally be non-planar with the surface 14, however, to provide a physical change in the surface that will be attractive to flying insects.

Figure 7:
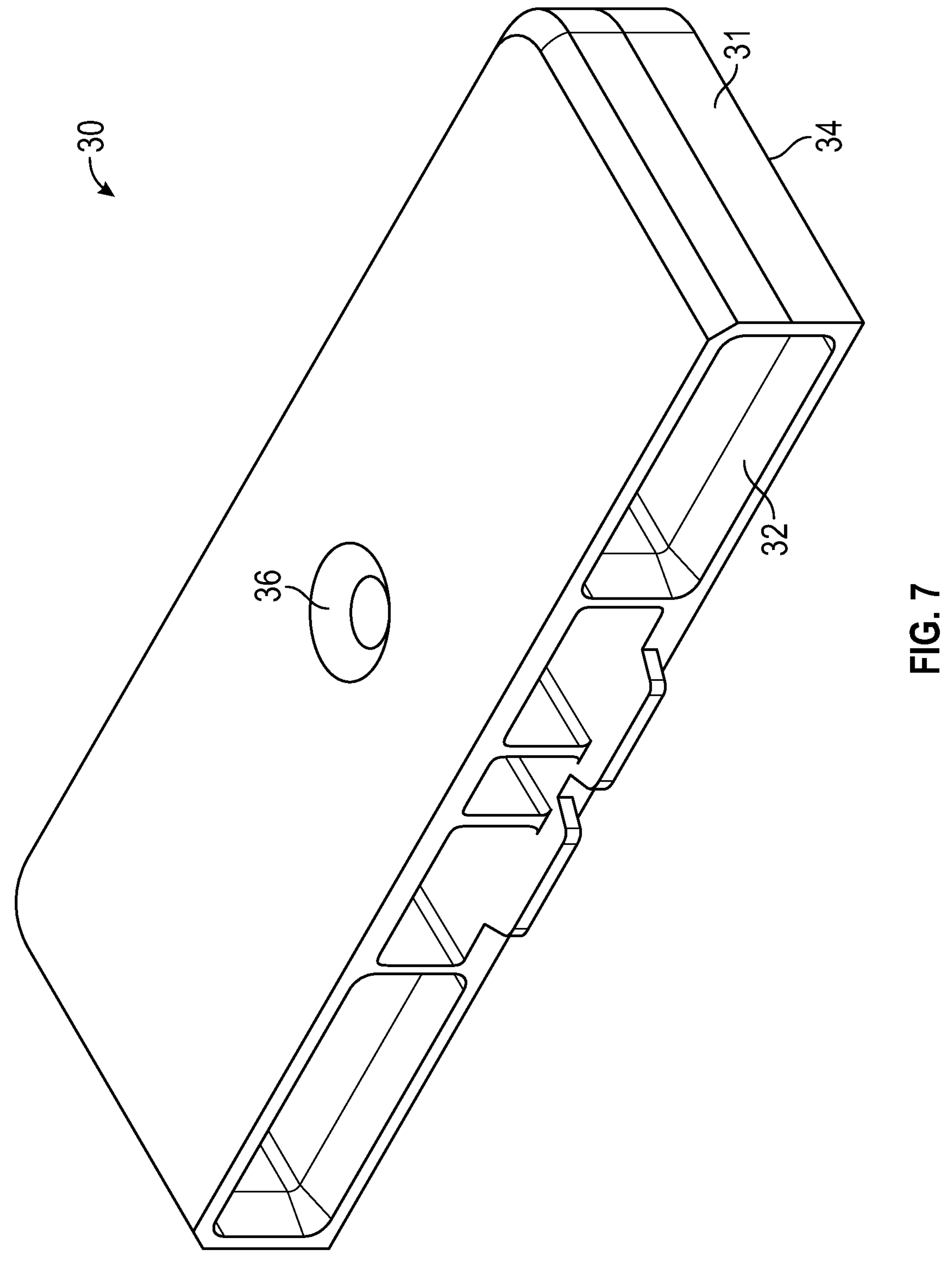
FIG. 7 is a perspective view of a mount for use with a flying insect station according to aspects and/or embodiments of the disclosure.

FIG. 7 is an enlarged view of an example mount 30 for use with any of the tools 12 provided, such as to provide an insect system 10 that can be placed at any number of surfaces or other locations for use in eliminating flying insects. The mount 30 is similar to the base/mount of U.S. Pat. No. 10,123,522, which is hereby incorporated by reference in its entirety.

The mount 30 includes a body 31 with slots 32. The mount 30 can always comprise a plastic or other rigid material. The slots 32 are generally configured similar to the tabs 19 to be able to receive the tabs in a locking connection, wherein the tabs can be selectively locked and unlocked from the slots to hold the station 12 in place relative to the mount 30. However, the release of the tabs will allow for the disengagement of the tool 12 relative to the mount 30, wherein the tool 12 can be cleaned, re-sprayed, thrown away, or otherwise managed at another location.

A mounting surface 34 is referred to as the surface that will be adjacent to, abut against, or otherwise positioned at a surface or location of use of the system 10. The mount 30 can be secured to the surface in a number of ways. For example, an adhesive 38, which may be any glue, cement, mucilage, tape, or paste that is any non-metallic substance applied to one or both surfaces of two separate items that binds them together and resists their separation, may be used to provide temporary or more permanent holding or connection. The adhesive can be used to hold the mount in place at the location.

In addition, the mount 30 can include a screw or other mechanical fastener aperture 36, in which screws, bolts, hooks, rods, pins, or other connecting or surface penetrating members to extend through the mount body 32 and into the surface.

EXAMPLES

The graphs shown in FIGS. 8-11 provide example data showing the effectiveness of the attractiveness of the tools including variations of the features, including surface texture, surface patterns, and the like. The graphs were the results of tests to determine house fly attraction to various tool configuration, (e.g., size, finish, structure) based on number of interactions and time spent on the tool.

The materials used for the tests include use of adult house flies (*Musca domestica*). Various surfaces were used, including, a 6"×3" black fly bait placement tool with two rows of structure and a small unstructured/smooth row with a matte finish, a 6"×3" black fly bait placement tool with two rows of structure and a small unstructured/smooth row with a glossy finish, and a 6"×1" black fly bait placement tool having structure and no unstructured/smooth areas and with a matte finish. White boxes sized 2'×2'×2' were used, along with cellophane and 3× GoPro cameras with cases and stands.

The three 2'×2'×2' boxes, white inside with cellophane covering the top, were constructed. A GoPro was mounted inside at the opposite side from the fly bait placement tool. Dental wick wetted with water on a jar lid and one sugar cube was provided. Thirty flies of mixed sex and aged 4-6 days old were added into each box. The flies were allowed to interact with the device for 30-minutes before being rotated to another box. All of the tools were untreated so that the attractancy could be determined by measuring the number of interactions and time spent on the different areas. The results of the tests are shown in the graphs of FIGS. 8-11.

Figure 8:
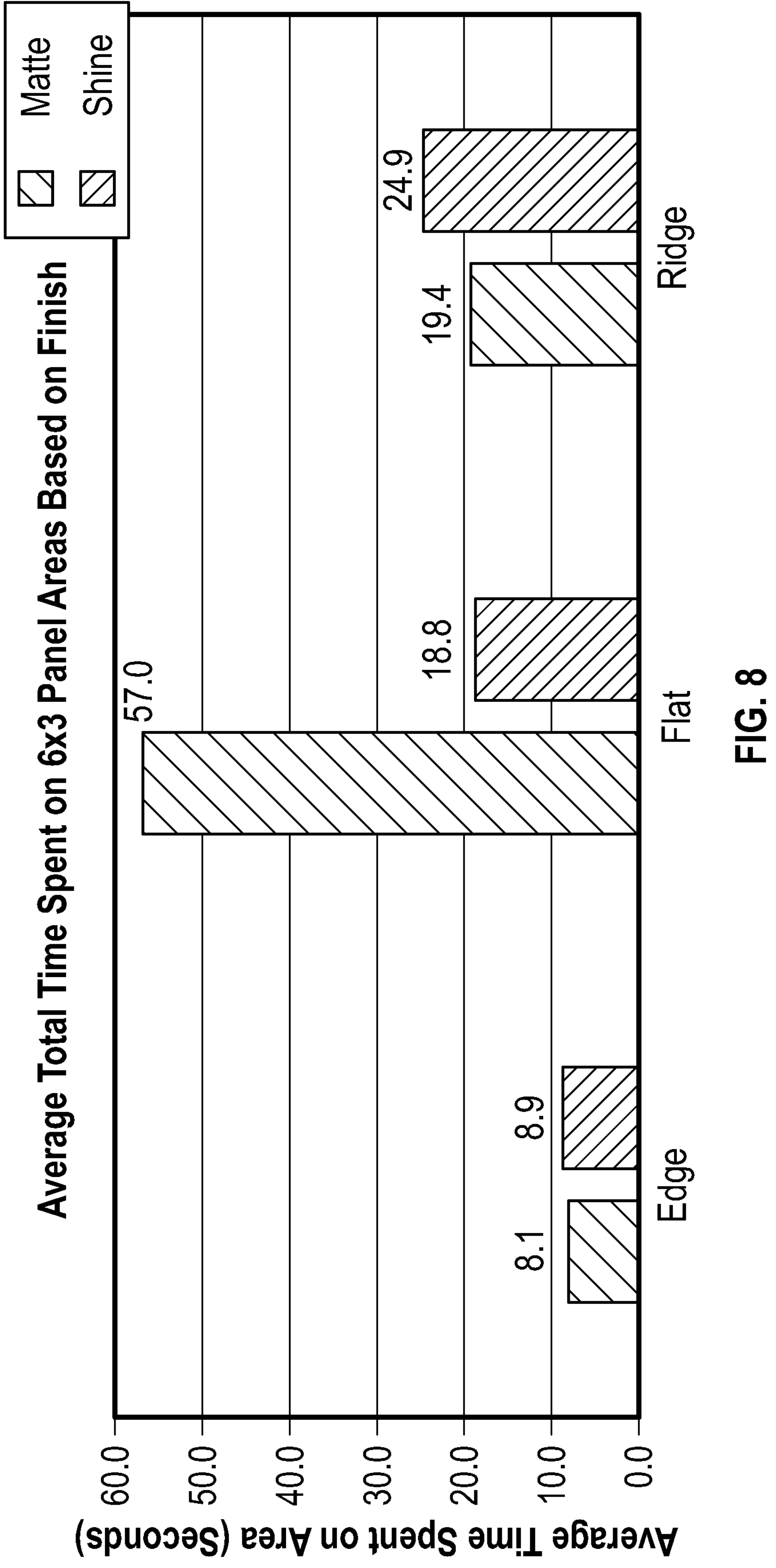
FIG. 8 is a graph showing the average time that flying insects spent on a flying insect surface according to variations as shown and/or described in the present disclosure.

In the graph of FIG. 8, the bars show the average total time that the flying insects spent on the tool having 6"×3" dimensions and including variations to the surface finish. This includes edges to the surface, flat surfaces, and ridges with variations to the texture in the form of matte finish and shine finish (smooth at the molecular level). It is noted that the insects spent more time on the tool with an edge when the surface had a shine. The insects spent more time on the tool when the surface was flat with a matte finish. With ridges included, the insects preferred a shiny surface.

Figure 9:
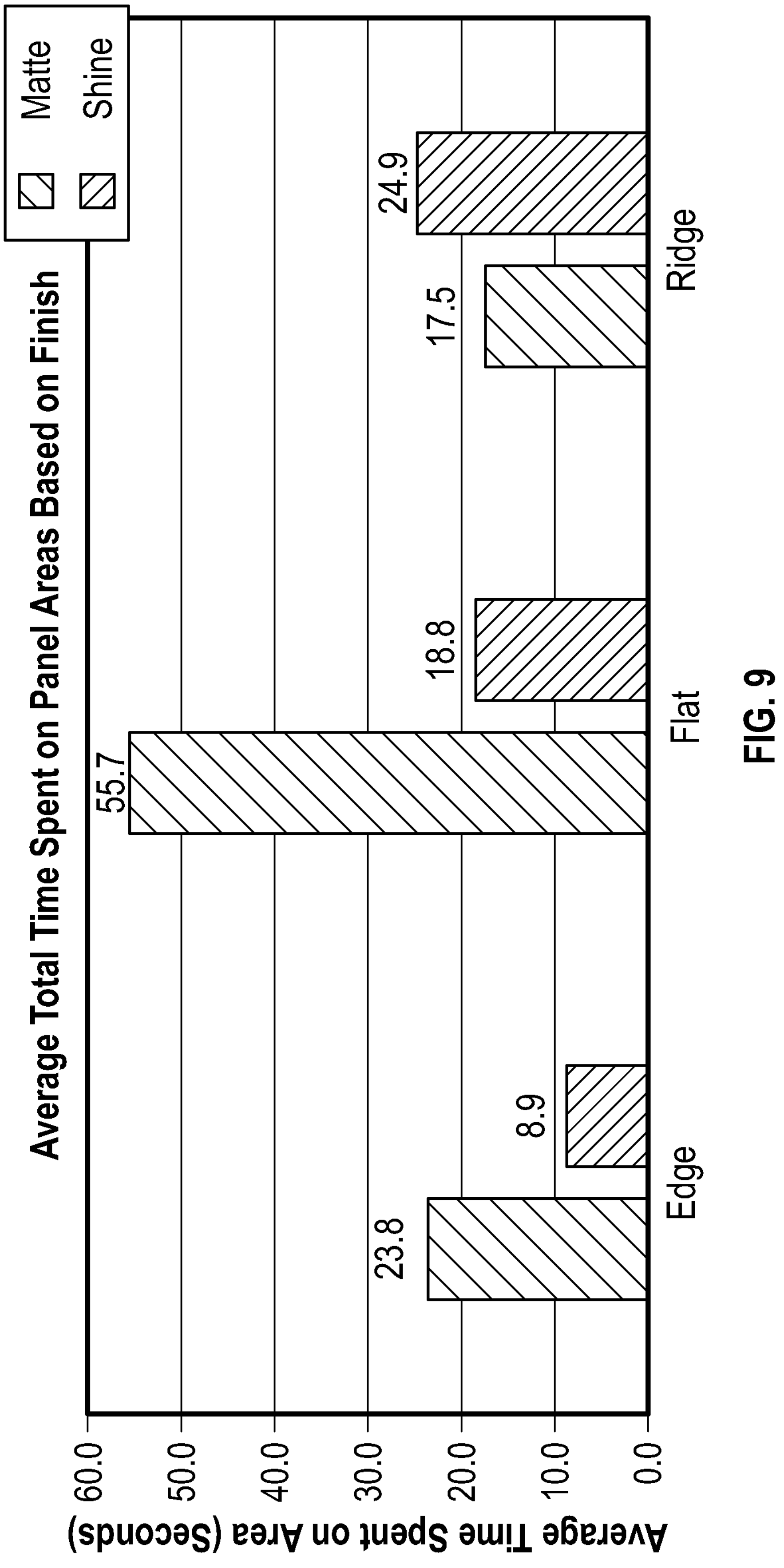
FIG. 9 is a graph showing the average total time a flying insect spent on a surface of a flying insect station based upon variable surface finishes.

Similar results are shown in the graph of FIG. 9, however, in this graph, there is an increase in the amount of time the insects spent on the matte surface with an edge.

Figure 10:
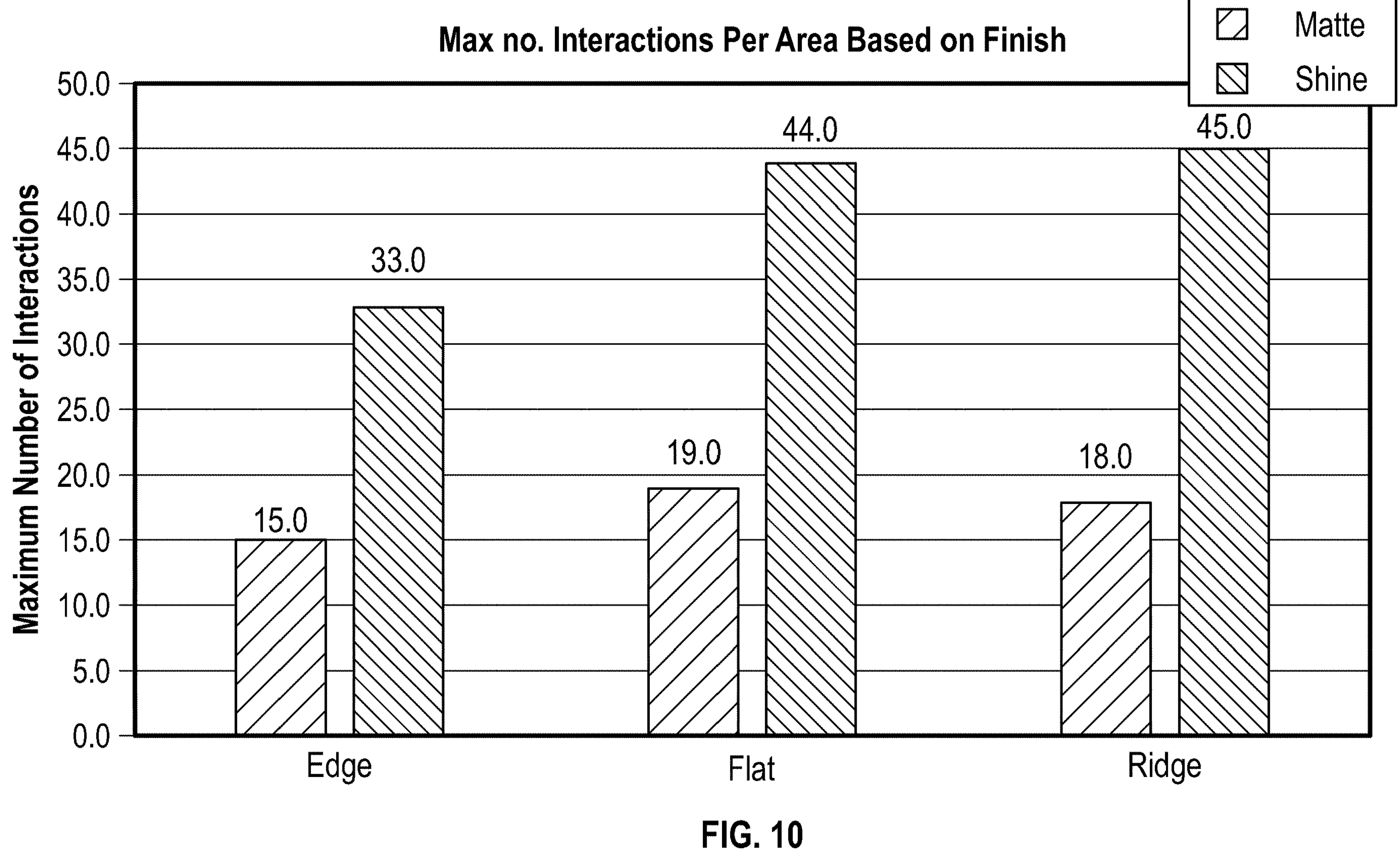
FIG. 10 is a graph showing the maximum number of flying insect interactions per area based upon the finish of a surface.

FIG. 10 is a graph showing the maximum number of interactions per area based on the finish of the tool surface. As shown in this figure, the shine surface provided more interactions than the matte surface. The graphs could show that the insects are more attracted to the shine surface, but will spend more time per interaction with the matte surface. Therefore, having both or contrasting surfaces may provide advantages in addition to retaining the pesticide, such as ensuring the maximum amount of interactions and time contacting the pesticide, which will increase the elimination efficiency of the combination of the tool and the pesticide.

Figure 11:
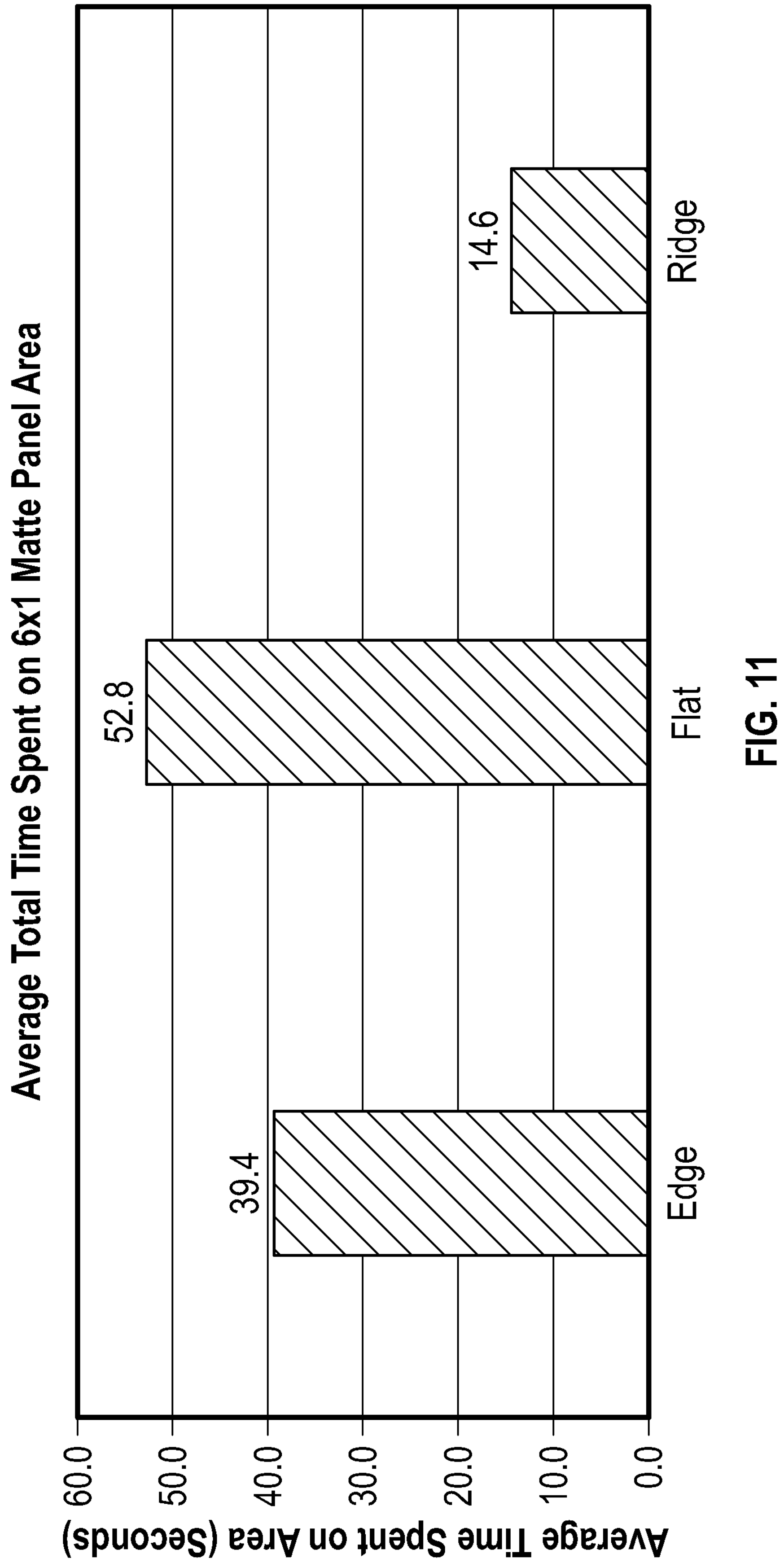
FIG. 11 is a graph showing the average total time that flying insects spent on a matte surface of a flying insect station.

Finally, the graph of FIG. 11 provides the average total time spent on a 6"×1" matte panel tool. According to this graph, the flat portion provided the most time spent, which shows that the tool can be effective in transferring the pesticide from the tool the insects to complete elimination of the insects.

Still additional aspects and/or embodiments are to be considered a part of the disclosure. For example, two or more flying insect tools or stations can be connected to a catch tray. The exact number of tools 12 is not to be limiting on the invention, as one or more than one tool may be used with a catch tray or trays. As has been disclosed, the tools 12 are used to entice flying insects to contact the surface of the tools. In addition to being attractive to flying insects, the tool surfaces will be used to hold an aerosolized agent, such as a pesticide. Thus, when the insects have been enticed to the surface, they will contact the pesticide and die. The use of the catch tray(s) with the tool(s) will provide a surface for the dead insects to be collected in a controlled manner. This will mitigate the insects falling to the ground or otherwise being located in a location that is difficult to collect for removal. Instead, the catch tray will collect the dead insects and can be easily cleaned by disposing of the dead insects from the tray. This will rid the location of the dead insects in an easy manner, while also mitigating direct contact with the pesticide on the surface of the tools or direct contact with the insects.

Additional aspects of the catch tray can include a sticky surface on the tray itself. The stickiness can be added by way of an adhesive or other surface texturing or material. Having the surface with a surface that may be sticky or have a texture will increase the chance that the dead insects will be "caught" by the tray, thus providing additional benefits and improvements for the collection of the dead insects for use with the flying insect tools. However, it should be appreciated that additional features, including but not limited to, sticky surfaces, cavities, lips, or the like, could be used to aid in collecting and controlling the location of the dead insects for use with the flying insect tools.

Therefore, the tools provided herein, provide an advantageous system that more efficiently attracts and eliminates flying insects. In addition, the use of the pesticide on the tool, instead of the surface or location, allows the pesticide to be used in more locations than application of the pesticide directly to the surface, such as due to regulations on the use of the pesticide.

From the foregoing, it can be seen that the invention accomplishes at least all of the stated objectives. The disclosed aspects and/or embodiments provide a removable device for the application of a pesticide product that can be applied away from a location of use, thus, providing greater flexibility and use for the elimination of flying insects in unwanted locations.

The invention claimed is:

1. A flying insect system, comprising:

a flying insect station comprising a station body having a substantially planar visual stimulus fly attractant surface, said visual stimulus fly attractant surface having an exterior boundary perimeter, being continuous throughout within the exterior boundary perimeter, and comprising one or more physical surface patterns extending outwardly from the visual stimulus fly attractant surface thus creating variation in height on the visual stimulus fly attractant surface within the exterior boundary perimeter via the physical surface patterns;

a surface mount connected to the station body and configured to mount the station body at a surface; and a pesticide applied to the visual stimulus fly attractant surface.

2. The flying insect system of claim 1, wherein the visual stimulus fly attractant surface further comprising contrasting colors.

3. The flying insect system of claim 1, wherein the one or more physical surface patterns comprise:

a. dimples;

b. framing;

c. curved swirl tracks; or d. a combination thereof.

4. The flying insect system of claim 1, wherein a substantially smooth portion is smooth to the molecular level.

5. The flying insect system of claim 1, wherein a textured surface portion comprises a glossy or matte texture.

6. The flying insect system of claim 5, wherein the pesticide comprises an aerosolized product and the textured surface portion aids in holding and retaining said aerosolized product.

7. The flying insect system of claim 1, wherein the surface mount comprises one or more slots.

8. The flying insect system of claim 7, wherein the station body comprises one or more tabs for releasably connecting with the one or more slots of the surface mount; and wherein the one or more tabs are snap fit into the one or more slots to provide the releasable connection between the station body and the surface mount.

9. The flying insect system of claim 8, further comprising a collection tray operatively connected to the flying insect station and configured to collect dead flying insects.

10. A flying insect station and mount combination, comprising:

a flying insect station comprising a station body having a substantially planar visual stimulus fly attractant surface, said visual stimulus fly attractant surface having an exterior boundary perimeter, being continuous throughout within the exterior boundary perimeter, and comprising one or more physical surface patterns extending inwardly into the visual stimulus fly attractant surface thus creating variation in height on the visual stimulus fly attractant surface within the exterior boundary perimeter via the physical surface patterns; and a mount for positioning the flying insect station at a surface, said mount releasably connectable to the flying insect station.

11. The combination of claim 10, wherein the visual stimulus fly attractant surface further comprises a textured surface portion and a substantially smooth portion.

12. The combination of claim 11, wherein the substantially smooth portion is smooth to the molecular level.

13. The combination of claim 12, wherein the textured surface portion comprises a glossy or matte texture.

14. The combination of claim 10, wherein the one or more physical surface patterns comprise:

a. dimples;

b. framing;

c. curved swirl tracks; or d. a combination thereof.

15. The combination of claim 14, wherein the dimples comprise a plurality of inward facing portions set into the visual stimulus fly attractant surface.

16. The combination of claim 10, wherein the surface mount comprises one or more slots, and the station body comprises one or more tabs for releasably connecting with the one or more slots of the surface mount.

17. The combination of claim 16, wherein the one or more tabs are snap fit into the one or more slots to provide the releasable connection between the station body and the surface mount.

18. A flying insect station, comprising:

a station body having a substantially planar visual stimulus fly attractant surface, said visual stimulus fly attractant surface having an exterior boundary perimeter, being continuous throughout within the exterior boundary perimeter, and comprising one or more physical surface patterns extending outwardly from the visual stimulus fly attractant surface thus creating variation in height on the visual stimulus fly attractant surface within the exterior boundary perimeter via the physical surface patterns;

a surface mount connected to the station body and configured to mount the station body at a surface;

wherein the surface mount comprises one or more slots, and the station body comprises one or more tabs for releasably connecting with the one or more slots of the surface mount; and a pesticide applied to the visual stimulus fly attractant surface.

19. The flying insect station of claim 18, wherein the visual stimulus fly attractant surface further comprises contrasting colors.

20. The flying insect station of claim 18, further comprising a catch tray operatively connected to the station for collection of dead insects.

* * * * *